(12) United States Patent
Li

(10) Patent No.: US 11,215,860 B2
(45) Date of Patent: Jan. 4, 2022

(54) DISPLAY PANEL AND TOUCH DISPLAY DEVICE

(71) Applicant: WUHAN CHINA STAR OPTOELECTRONICS TECHNOLOGY CO., LTD., Wuhan (CN)

(72) Inventor: Bangrong Li, Wuhan (CN)

(*) Notice: Subject to any disclaimer, the term of this patent is extended or adjusted under 35 U.S.C. 154(b) by 9 days.

(21) Appl. No.: 16/348,155

(22) PCT Filed: Jan. 25, 2019

(86) PCT No.: PCT/CN2019/073057
§ 371 (c)(1),
(2) Date: May 8, 2019

(87) PCT Pub. No.: WO2020/107696
PCT Pub. Date: Jun. 4, 2020

(65) Prior Publication Data
US 2020/0271972 A1    Aug. 27, 2020

(30) Foreign Application Priority Data
Nov. 30, 2018 (CN) .......................... 201811458017.6

(51) Int. Cl.
    *G02F 1/1333* (2006.01)
    *G02F 1/1362* (2006.01)
    *G02F 1/1368* (2006.01)
(52) U.S. Cl.
    CPC ........ *G02F 1/13338* (2013.01); *G02F 1/1368* (2013.01); *G02F 1/136286* (2013.01);
(Continued)

(58) Field of Classification Search
    CPC .................. G06F 3/0412; G06F 3/044; G06F 2203/04103; G06F 3/0416; G02F 1/13338;
(Continued)

(56) References Cited

U.S. PATENT DOCUMENTS

2011/0310069 A1* 12/2011 Sagawa ............... H01L 27/3258
    345/204
2014/0152948 A1* 6/2014 Chae ................. G02F 1/133345
    349/110
(Continued)

FOREIGN PATENT DOCUMENTS

CN        16348155 A1    5/2019

OTHER PUBLICATIONS

U.S. Appl. No. 16/348,155, filed May 8, 2019, Li, Bangrong.

*Primary Examiner* — Kent W Chang
*Assistant Examiner* — Sujit Shah

(57) ABSTRACT

A display panel and a touch display device are provided. The display panel includes a thin film transistor substrate, a planarization layer, and a through hole. The through hole exposes a source/drain electrode of the thin film transistor substrate. A first intermediate layer, a metal wire layer, a second intermediate layer, a first common electrode layer, a first passivation layer, and a first pixel electrode layer are stacked on each other and arranged corresponding to the source/drain electrode at one side of the through hole. A second common electrode layer, a second passivation layer, and a second pixel electrode layer are stacked on each other at another side of the through hole. The first common electrode layer is electrically connected to the metal wire layer, and the first pixel electrode layer is electrically connected to the second pixel electrode layer through and along the through hole.

18 Claims, 2 Drawing Sheets

(52) U.S. Cl.
CPC .. *G02F 1/133357* (2021.01); *G02F 2201/121* (2013.01); *G02F 2201/123* (2013.01)

(58) Field of Classification Search
CPC ............. G02F 1/136286; G02F 1/1368; G02F 2001/133357; G02F 2201/121; G02F 2201/123
See application file for complete search history.

(56) References Cited

U.S. PATENT DOCUMENTS

| | | | |
|---|---|---|---|
| 2015/0253912 A1* | 9/2015 | Liu | G06F 3/0443 345/174 |
| 2015/0309644 A1* | 10/2015 | Sun | G06F 3/0412 345/173 |
| 2016/0124280 A1* | 5/2016 | Park | G02F 1/13394 349/43 |
| 2016/0187692 A1* | 6/2016 | Woo | G06F 3/0445 257/72 |
| 2016/0187693 A1* | 6/2016 | Woo | G02F 1/13338 257/72 |
| 2017/0255308 A1* | 9/2017 | Li | G02F 1/133345 |
| 2018/0143729 A1* | 5/2018 | Lee | G06F 3/0416 |
| 2018/0348584 A1* | 12/2018 | Wu | G02F 1/133345 |

\* cited by examiner

DISPLAY PANEL AND TOUCH DISPLAY DEVICE

FIELD OF DISCLOSURE

The present invention relates to a field of display devices and in particular, to a display panel and a touch display device.

DESCRIPTION OF RELATED ART

According to different structures, conventional touch panels can be categorized into an add-on mode touch panel, an on-cell touch panel, and an in-cell touch panel. The add-on mode touch panel is produced by separately manufacturing a touch display and a liquid crystal display (LCD), and then attaching them together to form a liquid crystal display with a touch control function. The add-on mode touch panel has high production costs, has low light transmittance, and has a thick modular thickness. In the in-cell touch panel, a touch electrode of the touch panel is embedded inside the liquid crystal display. The in-cell touch panel has advantages in terms of lightness, thinness, and light transmittance, and is now extensively used in high-end smart phones.

In addition, compared with the add-on mode touch display, two layers of silicon nitride (SiNx) are added to the conventional in-cell touch display to avoid interference between touch signals and drive signals in the display. Specifically, the conventional in-cell touch display is provided with silicon nitride above and under the metal layer to achieve a normal touch control function. However, the addition of two layers of silicon nitride (SiNx) structure results in reduction in the light transmittance of a thin film transistor, thus also reducing the light transmittance of the touch display.

SUMMARY

A conventional in-cell touch display is provided with silicon nitride (SiNx) above and under the metal layer to achieve a normal touch control function. However, the addition of two layers of silicon nitride structure results in reduction in light transmittance of a thin film transistor, thus also reducing light transmittance of the touch display.

Accordingly, it is necessary to provide a display panel and a touch display device to solve the problems existing in conventional techniques.

It is an objective of the present invention to provide a display panel and a touch display device, which can effectively improve light transmittance and brightness of a thin film transistor substrate.

Accordingly, the present invention provides a display panel, comprising a thin film transistor substrate, a planarization layer disposed on the thin film transistor substrate, and a through hole defined in the planarization layer, the through hole exposing a source/drain electrode of the thin film transistor substrate, wherein a first intermediate layer, a metal wire layer, a second intermediate layer, a first common electrode layer, a first passivation layer, and a first pixel electrode layer are stacked on each other and are disposed corresponding to the source/drain electrode at one side of the through hole; and a second common electrode layer, a second passivation layer and a second pixel electrode layer are stacked on each other at another side of the through hole; wherein the first common electrode layer is electrically connected to the metal wire layer, and the first pixel electrode layer is electrically connected to the second pixel electrode layer through and along the through hole; wherein the first intermediate layer, the metal wire layer, the second intermediate layer, the first common electrode layer, the first passivation layer, and the first pixel electrode layer together define a non-display region; and the second common electrode layer, the second passivation layer and the second pixel electrode layer together define a display region.

According to one embodiment of the present invention, a level difference exists between the non-display region and the display region, and the planarization layer in the non-display region is level with the planarization layer in the display region.

According to one embodiment of the present invention, when the first pixel electrode layer is connected to the second pixel electrode layer through and along the through hole, a first gap is defined between the first pixel electrode layer and the first common electrode layer, and a second gap is defined between the second pixel electrode layer and the second common electrode layer.

According to one embodiment of the present invention, a height of the first pixel electrode layer is greater than a height of the second pixel electrode layer, and a height of the first common electrode layer is greater than a height of the second common electrode layer.

According to one embodiment of the present invention, a perforation hole is defined in the second intermediate layer, and the first common electrode layer is connected to the metal wire layer through the perforation hole.

The present invention further provides a display panel, comprising a thin film transistor substrate, a planarization layer disposed on the thin film transistor substrate, and a through hole defined in the planarization layer, the through hole exposing a source/drain electrode of the thin film transistor substrate, wherein a first intermediate layer, a metal wire layer, a second intermediate layer, a first common electrode layer, a first passivation layer, and a first pixel electrode layer are stacked on each other and are disposed corresponding to the source/drain electrode at one side of the through hole; and a second common electrode layer, a second passivation layer and a second pixel electrode layer are stacked on each other at another side of the through hole, wherein the first common electrode layer is electrically connected to the metal wire layer, and the first pixel electrode layer is electrically connected to the second pixel electrode layer through and along the through hole.

According to one embodiment of the present invention, the first intermediate layer, the metal wire layer, the second intermediate layer, the first common electrode layer, the first passivation layer, and the first pixel electrode layer together define a non-display region, and the second common electrode layer, the second passivation layer and the second pixel electrode layer together define a display region.

According to one embodiment of the present invention, a level difference exists between the non-display region and the display region, and the planarization layer in the non-display region is level with the planarization layer in the display region.

According to one embodiment of the present invention, when the first pixel electrode layer is connected to the second pixel electrode layer through and along the through hole, a first gap is defined between the first pixel electrode layer and the first common electrode layer, and a second gap is defined between the second pixel electrode layer and the second common electrode layer.

According to one embodiment of the present invention, a height of the first pixel electrode layer is greater than a height of the second pixel electrode layer, and a height of the first common electrode layer is greater than a height of the second common electrode layer.

According to one embodiment of the present invention, a perforation hole is defined in the second intermediate layer, and the first common electrode layer is connected to the metal wire layer through the perforation hole.

According to one embodiment of the present invention, the thin film transistor substrate further comprises a substrate, a low temperature polysilicon layer, a buffer layer, an active layer, a gate insulating layer, a gate electrode, a third intermediate layer, and the source/drain electrode, and the third intermediate layer is disposed between the planarization layer and the gate insulating layer.

The present invention further provides a touch display device which comprises the display panel of the foregoing embodiment.

According to one embodiment of the present invention, the first intermediate layer, the metal wire layer, the second intermediate layer, the first common electrode layer, the first passivation layer, and the first pixel electrode layer together define a non-display region; the second common electrode layer, the second passivation layer and the second pixel electrode layer together define a display region; a level difference exists between the non-display region and the display region; and the planarization layer in the non-display region is level with the planarization layer in the display region.

According to one embodiment of the present invention, when the first pixel electrode layer is connected to the second pixel electrode layer through and along the through hole, a first gap is defined between the first pixel electrode layer and the first common electrode layer, and a second gap is defined between the second pixel electrode layer and the second common electrode layer.

According to one embodiment of the present invention, a height of the first pixel electrode layer is greater than a height of the second pixel electrode layer, and a height of the first common electrode layer is greater than a height of the second common electrode layer.

According to one embodiment of the present invention, a perforation hole is defined in the second intermediate layer, and the first common electrode layer is connected to the metal wire layer through the perforation hole.

According to one embodiment of the present invention, the thin film transistor substrate further comprises a substrate, a low temperature polysilicon layer, a buffer layer, an active layer, a gate insulating layer, a gate electrode, a third intermediate layer, and the source/drain electrode, and the third intermediate layer is disposed between the planarization layer and the gate insulating layer.

According to one embodiment of the present invention, the touch display device is an in-cell touch display device.

The present invention further has the following function. The display region does not have the first intermediate layer and the second intermediate layer, so light transmittance and brightness of the thin film transistor substrate (ie, a pixel opening region) can be effectively improved, and as a result, light transmittance and brightness of the whole display panel are also improved.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, a person having ordinary skill in this field can obtain other figures according to these figures without an inventive work or paying the premise.

DETAILED DESCRIPTION OF EMBODIMENTS

The word "embodiment" mentioned in the detailed description means that a particular feature, structure, or characteristic described in connection with the embodiment may be included in at least one embodiment of the invention. The same terms appearing in different places in the specification are not necessarily limited to the same embodiment, but can belong to independent or alternative embodiments. In view of the technical solutions disclosed in the embodiments of the present invention, those skilled in the art should understand that the embodiments described herein may have other combinations or variations based on inventive concepts of the technical solutions.

Embodiments of the present disclosure are described in detail with reference to the accompanying drawings as follows. Directional terms such as up/down, right/left and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention. The same reference numbers are used throughout the drawings to refer to the same or similar parts.

Figure 1:
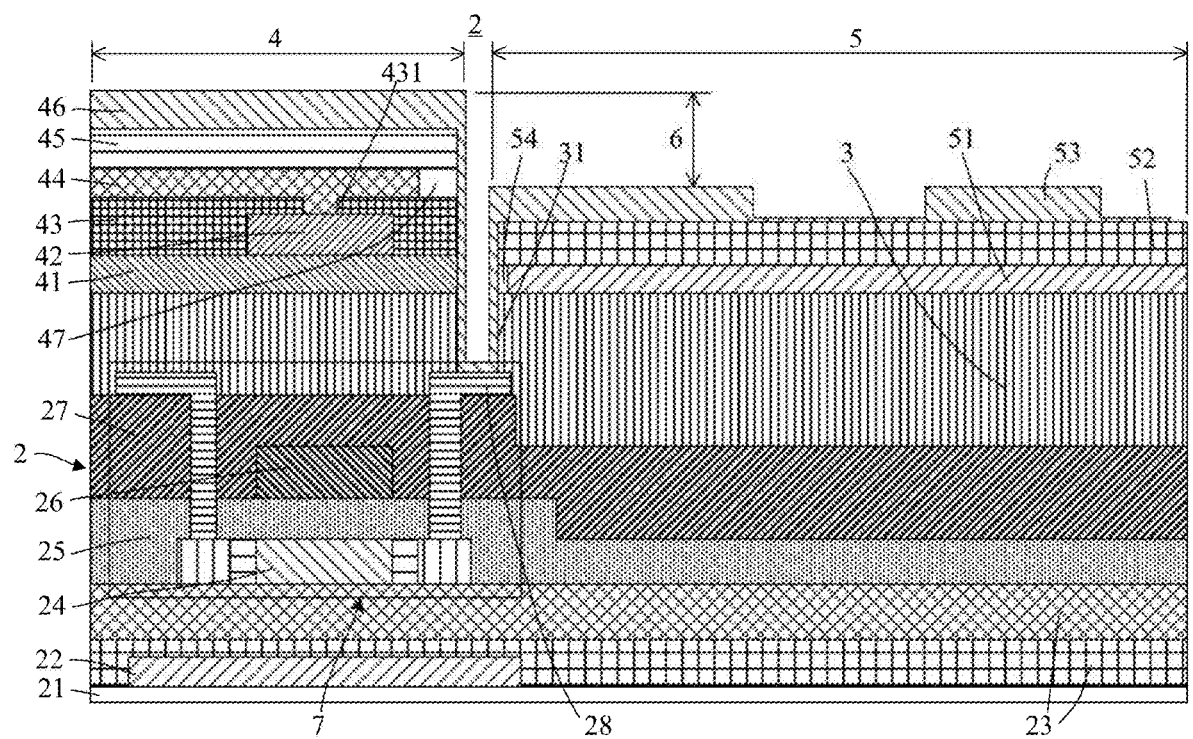
FIG. 1 is a cross-sectional view according to a preferable embodiment of the present invention.

Referring to FIG. 1, the present invention provides a display panel 1. The display panel 1 comprises a thin film transistor substrate 2, a planarization layer 3 disposed on the thin film transistor substrate 2, and a through hole 31 defined in the planarization layer 3, the through hole 31 exposing a source/drain electrode 28 of the thin film transistor substrate 2, wherein a first intermediate layer 41, a metal wire layer 42, a second intermediate layer 43, a first common electrode layer 44, a first passivation layer 45, and a first pixel electrode layer 46 are stacked on each other and are disposed corresponding to the source/drain electrode 28 at one side of the through hole 31; and a second common electrode layer 51, a second passivation layer 52, and a second pixel electrode layer 53 are stacked on each other at another side of the through hole 31. The first common electrode layer 44 is electrically connected to the metal wire layer 42, and the first pixel electrode layer 46 is electrically connected to the second pixel electrode layer 53 through and along the through hole 31.

Figure 2:
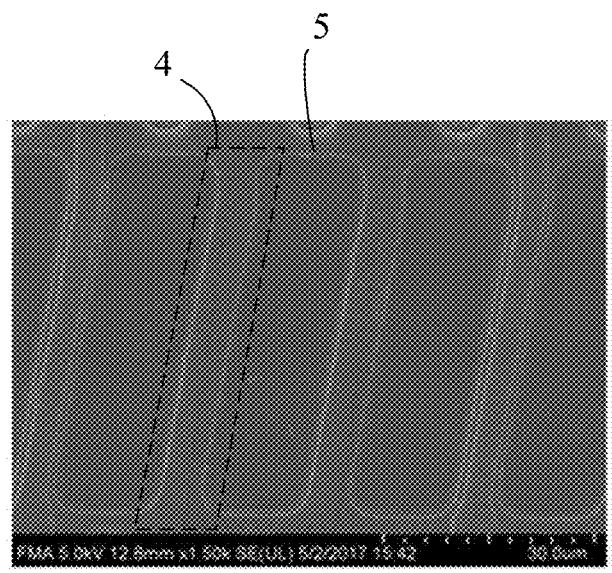
FIG. 2 is a top view according to a preferable embodiment of the present invention.
Figure 3:
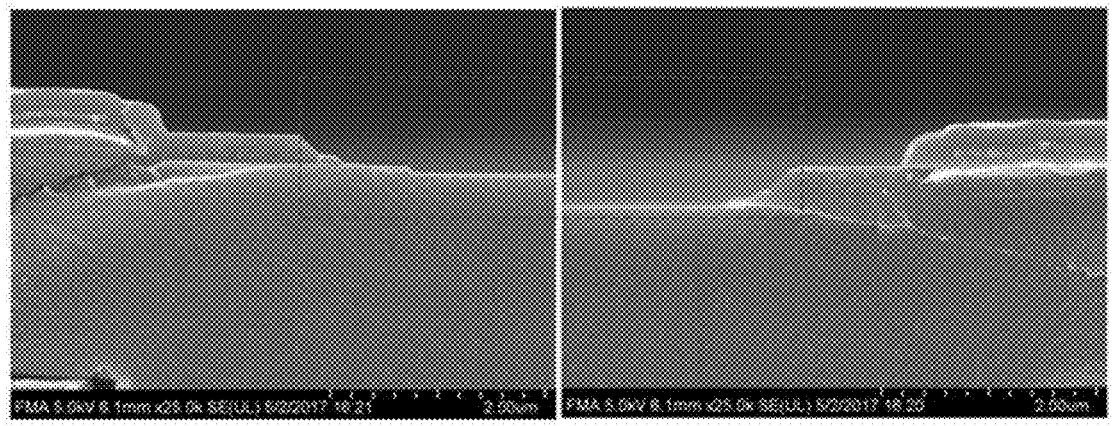
FIG. 3 is a side view according to a preferable embodiment of the present invention.

Referring to FIGS. 2 and 3, the first intermediate layer 41, the metal wire layer 42, the second intermediate layer 43, the first common electrode layer 44, the first passivation layer 45, and the first pixel electrode layer 46 together define a non-display region 4; and the second common electrode layer 51, the second passivation layer 52, and the second pixel electrode layer 53 together define a display region 5. A level difference 6 exists between the non-display region 4 and the display region 5, and the planarization layer 3 in the non-display region 4 is level with the planarization layer 3 in the display region 5.

A height of the first pixel electrode layer 46 is greater than a height of the second pixel electrode layer 53, and a height of the first common electrode layer 44 is greater than a height of the second common electrode layer 51. In detail, compared with the non-display region 4, the display region 5 does not have the first intermediate layer 41 and the second intermediate layer 43, so that the display region 5 is lower than the non-display region 4. Therefore, light transmittance and brightness of the thin film transistor substrate 2 (i.e. a pixel opening region) can be effectively improved. The first intermediate layer 41 and the second intermediate layer 43 are made of a same material which is preferably silicon nitride (SiNx).

Furthermore, a perforation hole 431 is defined in the second intermediate layer 43, and the first common electrode layer 44 is connected to the metal wire layer 42 through the perforation hole 413. When the first pixel electrode layer 46 is connected to the second pixel electrode layer 53 through and along the through hole 31, a first gap 47 is defined between the first pixel electrode layer 46 and the first common electrode layer 44, and a second gap 54 is defined between the second pixel electrode layer 53 and the second common electrode layer 51, thus preventing a short circuit.

It should be noted that, the thin film transistor substrate 2 further comprises a substrate 21, a low temperature polysilicon layer 22, a buffer layer 23, an active layer 24, a gate insulating layer 25, a gate electrode 26, a third intermediate layer 27, and the source/drain electrode 28 which are stacked on each other in sequence and constitute a thin film transistor (TFT) 7, wherein the third intermediate layer 27 is disposed between the planarization layer 3 and the gate insulating layer 25. However, in the non-display region 5, the third intermediate layer 27 is disposed between the source/drain electrode 28 and the gate electrode 26.

The present invention further provides a touch display device (not illustrated) which comprises the display panel 1 of the above-mentioned embodiment. The touch display device is preferably an in-cell touch display device. The non-display region 4 is arranged corresponding to a black matrix (not shown) of an upper color filter (CF), so light cannot penetrate. The display region 5 is arranged corresponding to a pixel layer of the upper color filter film (not illustrated), so light can penetrate, thus increasing light transmittance and brightness.

In an actual manufacturing process, the display region 5 and the non-display region 4 are formed simultaneously after formation of the second intermediate layer 43. By adjusting etching parameters in processes of etching the two regions, etching time can be extended. For example, the etching time is adjusted from 30 seconds to 60 seconds. By extending the etching time for the display region 5 to 60 seconds, the first intermediate layer 41 and the second intermediate layer 43 of the display region 5 are both etched away. In other words, the display region 5 does not have the first intermediate layer 41 and the second intermediate layer 43, so brightness and light transmittance of the thin film transistor substrate 2 (i.e. the pixel opening region) can be effectively improved, thereby improving light transmittance and brightness of the display panel 1/the whole touch display device.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A display panel, comprising:
   a thin film transistor substrate;
   a planarization layer disposed on the thin film transistor substrate; and
   a through hole defined in the planarization layer, the through hole exposing a source/drain electrode of the thin film transistor substrate;
   wherein at one side of the through hole corresponding to the source/drain electrode, a metal wire layer is disposed on a first intermediate layer, a second intermediate layer is disposed on the metal wire layer, a first common electrode layer is disposed on the second intermediate layer, a first passivation layer is disposed on the first common electrode layer, and a first pixel electrode layer is disposed on the first passivation layer; and at another side of the through hole, a second passivation layer is disposed on a second common electrode layer, and a second pixel electrode layer is disposed on the second passivation layer;
   wherein the first common electrode layer is electrically connected to the metal wire layer, and the first pixel electrode layer is electrically connected to the second pixel electrode layer through and along the through hole; wherein the first intermediate layer, the metal wire layer, the second intermediate layer, the first common electrode layer, the first passivation layer, and the first pixel electrode layer together define a non-display region; and the second common electrode layer, the second passivation layer, and the second pixel electrode layer together define a display region, wherein there is a level difference between the non-display region and the display region, the non-display region is higher than the display region, and the planarization layer in the non-display region is level with the planarization layer in the display region.

2. The display panel according to claim 1, wherein a height of the first pixel electrode layer is greater than a height of the second pixel electrode layer, and a height of the first common electrode layer is greater than a height of the second common electrode layer.

3. The display panel according to claim 1, wherein a perforation hole is defined in the second intermediate layer, and the first common electrode layer is connected to the metal wire layer through the perforation hole.

4. The display panel according to claim 1, wherein the first common electrode layer is not at a same level with the second common electrode layer, the first passivation layer is not at a same level with the second passivation layer, and the first pixel electrode layer is not at a same level with the second pixel electrode layer.

5. The display panel according to claim 1, wherein when the first pixel electrode layer is connected to the second pixel electrode layer through and along the through hole, a first gap is defined between the first pixel electrode layer and the first common electrode layer, a second gap is defined between the second pixel electrode layer and the second common electrode layer, the first gap is defined in a same layer as the first common electrode layer, and the second gap is defined in a same layer as the second common electrode layer.

6. A display panel, comprising:
   a thin film transistor substrate;
   a planarization layer disposed on the thin film transistor substrate; and
   a through hole defined in the planarization layer, the through hole exposing a source/drain electrode of the thin film transistor substrate;

wherein at one side of the through hole corresponding to the source/drain electrode, a metal wire layer is disposed on a first intermediate layer, a second intermediate layer is disposed on the metal wire layer, a first common electrode layer is disposed on the second intermediate layer, a first passivation layer is disposed on the first common electrode layer, and a first pixel electrode layer is disposed on the first passivation layer; and at another side of the through hole, a second passivation layer is disposed on a second common electrode layer, and a second pixel electrode layer is disposed on the second passivation layer, wherein the first common electrode layer is electrically connected to the metal wire layer, and the first pixel electrode layer is electrically connected to the second pixel electrode layer through and along the through hole;

wherein the first intermediate layer, the metal wire layer, the second intermediate layer, the first common electrode layer, the first passivation layer, and the first pixel electrode layer together define a non-display region, and the second common electrode layer, the second passivation layer, and the second pixel electrode layer together define a display region, wherein a level difference exists between the non-display region and the display region, the non-display region is higher than the display region, and the planarization layer in the non-display region is level with the planarization layer in the display region.

7. The display panel according to claim 6, wherein a height of the first pixel electrode layer is greater than a height of the second pixel electrode layer, and a height of the first common electrode layer is greater than a height of the second common electrode layer.

8. The display panel according to claim 6, wherein a perforation hole is defined in the second intermediate layer, and the first common electrode layer is connected to the metal wire layer through the perforation hole.

9. The display panel according to claim 6, wherein the thin film transistor substrate further comprises a substrate, a low temperature polysilicon layer, a buffer layer, an active layer, a gate insulating layer, a gate electrode, a third intermediate layer, and the source/drain electrode which are stacked on each other in sequence, and the third intermediate layer is disposed between the planarization layer and the gate insulating layer.

10. The display panel according to claim 6, wherein the first intermediate layer and the second intermediate layer are made of a same material which is silicon nitride.

11. A touch display device, comprising the display panel of claim 6.

12. The touch display device according to claim 11, wherein the first intermediate layer, the metal wire layer, the second intermediate layer, the first common electrode layer, the first passivation layer, and the first pixel electrode layer together define a non-display region; the second common electrode layer, the second passivation layer, and the second pixel electrode layer together define a display region; a level difference exists between the non-display region and the display region; and the planarization layer in the non-display region is level with the planarization layer in the display region.

13. The touch display device according to claim 11, wherein a height of the first pixel electrode layer is greater than a height of the second pixel electrode layer, and a height of the first common electrode layer is greater than a height of the second common electrode layer.

14. The touch display device according to claim 11, wherein a perforation hole is defined in the second intermediate layer, and the first common electrode layer is connected to the metal wire layer through the perforation hole.

15. The touch display device according to claim 11, wherein the thin film transistor substrate further comprises a substrate, a low temperature polysilicon layer, a buffer layer, an active layer, a gate insulating layer, a gate electrode, a third intermediate layer, and the source/drain electrode which are stacked on each other in sequence, and the third intermediate layer is disposed between the planarization layer and the gate insulating layer.

16. The touch display device according to claim 11, wherein the touch display device is an in-cell touch display device.

17. The display panel according to claim 6, wherein the first common electrode layer is not at a same level with the second common electrode layer, the first passivation layer is not at a same level with the second passivation layer, and the first pixel electrode layer is not at a same level with the second pixel electrode layer.

18. The display panel according to claim 6, wherein when the first pixel electrode layer is connected to the second pixel electrode layer through and along the through hole, a first gap is defined between the first pixel electrode layer and the first common electrode layer, a second gap is defined between the second pixel electrode layer and the second common electrode layer, the first gap is defined in a same layer as the first common electrode layer, and the second gap is defined in a same layer as the second common electrode layer.

* * * * *